United States Patent
Kagawa et al.

(10) Patent No.: US 10,538,027 B2
(45) Date of Patent: *Jan. 21, 2020

(54) APPARATUS FOR PRODUCING EASY-TO-TEAR PLASTIC FILM

(71) Applicants: Seiji Kagawa, Koshigaya-shi, Saitama (JP); Atsuko Kagawa, Koshigaya-shi, Saitama (JP)

(72) Inventors: Seiji Kagawa, Koshigaya (JP); Yoichiro Kagawa, Koshigaya (JP)

(73) Assignees: Seiji Kagawa, Koshigaya-Shi (JP); Atsuko Kagawa, Koshigaya-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/868,675

(22) Filed: Jan. 11, 2018

(65) Prior Publication Data

US 2018/0215090 A1    Aug. 2, 2018

(30) Foreign Application Priority Data

Jan. 27, 2017 (JP) .................................. 2017-13388

(51) Int. Cl.
  *B29C 59/04* (2006.01)
  *B29C 59/00* (2006.01)
  *B29K 67/00* (2006.01)

(52) U.S. Cl.
  CPC .......... *B29C 59/046* (2013.01); *B29C 59/002* (2013.01); *B29K 2067/003* (2013.01);
  (Continued)

(58) Field of Classification Search
  None
  See application file for complete search history.

(56) References Cited

U.S. PATENT DOCUMENTS 3,273,199 A * 9/1966 Kleinewefers ....... B01D 35/005
                                                      100/158 C
5,648,107 A * 7/1997 Kagawa ................... B26F 1/24
                                                       264/284

(Continued)

FOREIGN PATENT DOCUMENTS

JP     6-328483 A    11/1994
JP     7-165256 A     6/1995
(Continued)

OTHER PUBLICATIONS

Notice of Reasons for Rejection for Japanese Patent Application No. 2017-013388, dated Feb. 28, 2017.
(Continued)

*Primary Examiner* — Xiao S Zhao
*Assistant Examiner* — Asha A Thomas
(74) *Attorney, Agent, or Firm* — Birch, Stewart, Kolasch & Birch, LLP

(57) ABSTRACT

An apparatus for producing an easy-to-tear plastic film comprising a pattern roll rotatably supported by a pair of stationary frames, an anvil roll moving along a pair of movable frames, a first driving unit for rotating the movable frames, and second driving units each mounted to the movable frame to move the anvil roll up and down; high-hardness, fine particles projecting from a rolling surface of the pattern roll having such average height and maximum height as enabling the formation of unpenetrating fine pores in a plastic film; with the anvil roll inclined to the pattern roll in a horizontal plane by the operation of the first driving unit, large numbers of unpenetrating fine pores being formed transversely uniformly in the plastic film passing through a gap of both rolls.

11 Claims, 15 Drawing Sheets

(52) U.S. Cl.
CPC ............... *B29K 2995/0067* (2013.01); *B29K 2995/0081* (2013.01)

(56) References Cited

U.S. PATENT DOCUMENTS

| | | | | |
|---|---|---|---|---|
| 6,210,145 B1 * | 4/2001 | Seide | ............... | B29C 43/22 425/194 |
| 2017/0136712 A1 | 5/2017 | Kagawa | | |

FOREIGN PATENT DOCUMENTS

| | | |
|---|---|---|
| JP | 10-193454 A | 7/1998 |
| JP | 5926437 B1 | 5/2016 |
| KR | 20-0432486 Y1 | 12/2006 |

OTHER PUBLICATIONS

Korean Office Action, dated Apr. 1, 2019, for Korean Application No. 10-2018-0009895, along with an English translation.

* cited by examiner

APPARATUS FOR PRODUCING EASY-TO-TEAR PLASTIC FILM

FIELD OF THE INVENTION

The present invention relates to an apparatus for producing an easy-to-tear plastic film provided with only unpenetrating fine pores for gas barrier.

BACKGROUND OF THE INVENTION

Dry foods such as instant coffee, milk powder, tea, etc. are wrapped by an aluminum-deposited film having good sealability, etc., to be protected from oxygen and moisture. For example, an aluminum-deposited film 300 comprises, as shown in FIG. 16, a high-strength polyethylene terephthalate (PET) film 301, a print layer 302, a vapor-deposited aluminum layer 303, and a heat-sealing layer 304. As shown in FIG. 17, a bag 310 of an aluminum-deposited film is often provided with a notch 311 as a starting point of tearing.

However, an aluminum-deposited film cannot be torn easily in many cases, even with a notch 311, because of a vapor-deposited aluminum layer, a heat-sealing layer and a print layer formed on a PET film. Particularly because a heat-sealed portion 312 is twice as thick as other portions of the aluminum-deposited film, tearing starting from the notch positioned outside the heat-sealed portion 312 is often stopped by the heat-sealed portion 312.

In view of such circumstances, as a film easily tearable from any position without a notch, the inventor previously proposed by JP 7-165256 A an easy-to-tear plastic film comprising a porous film of polyester, nylon or oriented polypropylene, whose entire surface is provided with penetrating or unpenetrating pores having an average opening diameter of 0.5-100 μm at a density of 1,000/cm² or more; and a heat-fusible polymer film laminated on a surface of the porous film. However, because this easy-to-tear plastic film has penetrating pores, it cannot be used for applications required to completely prevent the permeation of oxygen and moisture.

As a plastic film provided with unpenetrating fine pores, JP 10-193454 A discloses a tubular film of a polyolefinic resin composition containing an inorganic filler, which is as thick as 5-150 one or both of inner and outer surfaces of the tubular film being subjected to a corona discharge treatment, and at least part of the tubular film being embossed. Embosses (measured according to JIS B0601) are as deep as ½-⅒ of the film thickness, and usually as large as 0.5-300 mm. However, because these embosses are too large, the tubular film has poor appearance. If small embosses were to be formed, an extremely expensive embossing roll having large numbers of small projections would have to be used, inevitably resulting in expensive embossed films.

When large numbers of fine pores are formed in a plastic film by a pattern roll and an anvil roll, as shown in FIG. 18, both of a pattern roll 10 and an anvil roll 20 were bent by a large load, resulting in a gap G wider in its transverse center portion. Fine pores formed by an uneven gap G have opening diameters and depths, which differ between the transverse center portion and peripheral portions, failing to provide a uniform microporous plastic film.

Accordingly, attempts have been made to reduce the bending of the pattern roll 10 and the anvil roll 20 by arranging backup rolls above the pattern roll 10 and/or below the anvil roll 20. However, because large numbers of high-hardness, fine particles are fixed to a rolling surface of the pattern roll 10, a rubber roll having a soft surface, etc. should be used as a backup roll, failing to sufficiently prevent the bending of the pattern roll 10 and the anvil roll 20.

JP 6-328483 A discloses an apparatus for calendaring a film of a thermoplastic polymer or rubber by six rolls arranged in substantially parallel, a sixth roll being arranged just under first to fifth rolls; and comprising a crossing means for inclining the fifth roll by a small angle. However, the angle of the fifth roll inclined by the crossing means is constant, and the calendaring apparatus does not have a driving means for obtaining a desired inclination angle. Accordingly, even if this calendaring apparatus were used to form unpenetrating fine pores in a plastic film, unpenetrating fine pores having various sizes and distributions cannot be formed uniformly in a width direction.

OBJECT OF THE INVENTION

Accordingly, an object of the present invention is to provide an apparatus for producing an inexpensive, easy-to-tear plastic film, which can be easily torn from any position, while completely preventing the penetration of oxygen, moisture, etc.

SUMMARY OF THE INVENTION

As a result of intensive research in view of the above object, the inventor has found that (1) when the center axes of a pattern roll 10 and an anvil roll 20 slightly bent by stress are inclined by a small angle θ as shown in FIGS. 3(a) and 3(b), the pattern roll 10 and the anvil roll 20 spirally come into linear contact with each other under a uniform pressure, making it possible to form large numbers of fine pores in a wide plastic film 2 transversely uniformly; and that (2) by controlling the height of high-hardness, fine particles on the pattern roll 10, only unpenetrating fine pores can be formed in a plastic film without using an embossing roll. The present invention has been completed based on such findings.

Thus, the apparatus of the present invention for producing an easy-to-tear plastic film randomly having large numbers (pluralities) of unpenetrating fine pores on an entire surface of a plastic film, comprises

- a first roll rotatably supported by a pair of laterally arranged stationary frames;
- a second roll movable up and down along a pair of laterally arranged movable frames, such that the second roll comes into contact with the first roll via a plastic film;
- a conveying mechanism for passing the plastic film through a gap between the first and second rolls;
- a first driving unit for rotating a pair of the movable frames;
- second driving units each mounted to each of the movable frames to move the second roll up and down;
- a third driving unit for rotating the first roll; and
- a fourth driving unit for rotating the second roll;
- one of the first and second rolls being a pattern roll randomly having large numbers (pluralities) of high-hardness, fine particles on its rolling surface, and the other being an anvil roll having a flat rolling surface;
- the high-hardness, fine particles projecting from a rolling surface of the pattern roll having such average height and maximum height as to enable the formation of unpenetrating fine pores having an average depth corresponding to 30-80% of the thickness of the plastic film and the maximum depth corresponding to 90% or less of the thickness of the plastic film, in the plastic film; and with the center axis of the second roll inclined to the center axis of the first roll in a horizontal plane by the operation of the first driving unit, the plastic film passing through a gap between the first and second rolls, thereby causing the high-hardness, fine particles to form large numbers (pluralities) of unpenetrating fine pores transversely uniformly in the plastic film.

A pair of the movable frames are preferably rotated by the first driving unit along a pair of laterally-arranged, horizontal, circularly-curved guide rails.

The movable plates, to which the movable frames are fixed, are preferably fixed to both ends of a horizontal plate connected to the first driving unit.

Each of the circularly curved guide rails preferably engages a guide groove on a bottom surface of each of the movable plates.

It is preferable in the apparatus of the present invention for producing an easy-to-tear plastic film that a strain-removing roll coming into contact with a plastic film provided with large numbers of unpenetrating fine pores (unpenetrating-fine-pores-formed plastic film), and a pair of fifth driving units for changing the heights of bearings rotatably supporting both ends of the strain-removing roll are arranged downstream of a gap between the first and second rolls; and at least one end of the strain-removing rolls is moved up or down by operating at least one of the fifth driving units, thereby vertically inclining the strain-removing roll to the unpenetrating-fine-pores-formed plastic film, to absorb strain generated in the unpenetrating-fine-pores-formed plastic film due to the inclination of the center axis of the second roll to the center axis of the first roll.

The apparatus of the present invention for producing an easy-to-tear plastic film preferably further comprises a sensor disposed downstream of a gap between the first and second rolls for observing the characteristics of the resultant unpenetrating-fine-pores-formed plastic film; and a controller receiving output signals of the sensor for forming a signal for adjusting a gap between the first and second rolls, a signal for adjusting the horizontal inclination angle of the center axis of the second roll to the center axis of the first roll, and a signal for adjusting the vertical inclination angle of the strain-removing roll, to obtain a desired unpenetrating-fine-pores-formed plastic film.

It is preferable that the formation of unpenetrating fine pores in the plastic film is started, in a state where the horizontal inclination angle of the center axis of the second roll to the center axis of the first roll is 0°, and where the vertical inclination angle of the strain-removing roll is 0°; and the first and second driving units and the fifth driving units are then operated according to the output signals of the sensor.

It is preferable that the first roll is a pattern roll, and that the second roll is an anvil roll. The anvil roll is preferably a metal roll.

The high-hardness, fine particles of the pattern roll preferably have sharp edges and Mohs hardness of 5 or more.

The high-hardness, fine particles have an average particle diameter of preferably 20-100 μm, more preferably 25-80 μm, on the rolling surface.

The distribution density of the high-hardness, fine particles on the rolling surface of the pattern roll is preferably 500-40,000/cm$^2$, more preferably 1,000-20,000/cm$^2$, most preferably 2,000-10,000/cm$^2$.

The area ratio of the high-hardness, fine particles on the rolling surface of the pattern roll is preferably 10-70%.

The easy-to-tear plastic film produced by the apparatus of the present invention has large numbers of unpenetrating fine pores having various depths and sizes, which are randomly formed on an entire surface of a plastic film by pressing the high-hardness, fine particles;

the unpenetrating fine pores having an average depth corresponding to 30-80% of the thickness of the plastic film, and the maximum depth corresponding to 90% or less of the thickness of the plastic film; the unpenetrating fine pores having an average pore diameter of 20-100 μm; and the unpenetrating fine pores having a distribution density of 500-40,000/cm$^2$.

The unpenetrating fine pores preferably have an average depth corresponding to 30-65% of the thickness of the plastic film, and the maximum depth corresponding to 85% or less of the thickness of the plastic film.

The unpenetrating fine pores preferably have an average pore diameter of 25-80 μm.

The unpenetrating fine pores have a distribution density of preferably 1,000-20,000/cm$^2$, more preferably 2,000-10,000/cm$^2$.

The plastic film is preferably a polyethylene terephthalate film.

The plastic film is preferably as thick as 8-30 μm.

The easy-to-tear plastic film produced by the apparatus of the present invention may be provided with a heat-sealing layer on an entire surface of the plastic film on the side of having no unpenetrating fine pores.

A gas barrier layer may be formed between the plastic film on the side of having no unpenetrating fine pores and the heat-sealing layer. The gas barrier layer is preferably an aluminum foil, a vapor-deposited aluminum layer, or a vapor-deposited, transparent inorganic oxide layer. The vapor-deposited, transparent inorganic oxide layer is preferably made of silicon oxide or alumina.

DESCRIPTION OF THE PREFERRED EMBODIMENTS

The embodiments of the present invention will be explained in detail below referring to the attached drawings. Explanations of each embodiment are applicable to other embodiments unless otherwise mentioned. Explanations below are not restrictive, but various modifications may be made within the scope of the present invention.

[1] Production Apparatus of Easy-to-Tear Plastic Film (A) First Embodiment

Figure 4:
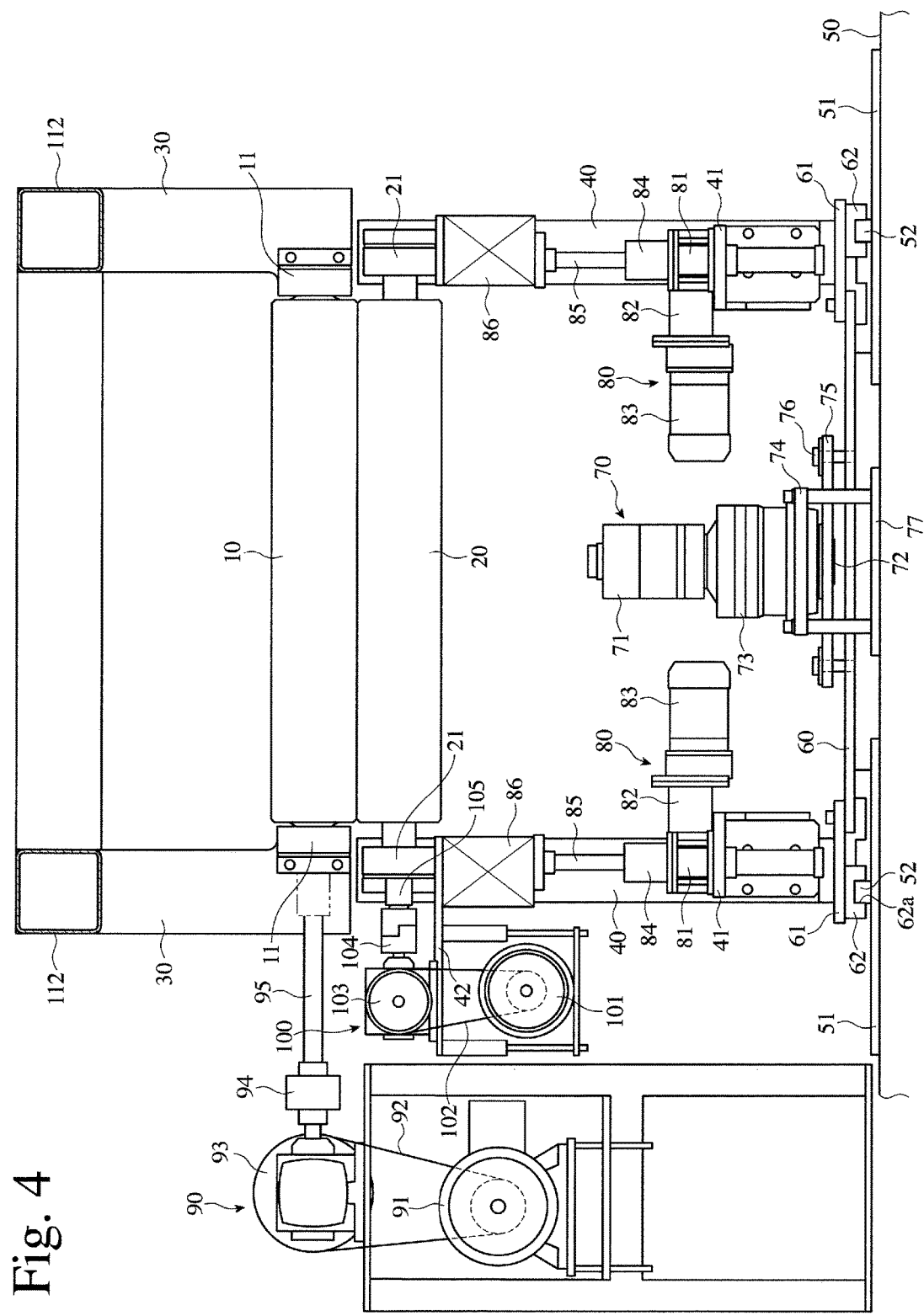
FIG. 4 is a front view showing a main portion of an apparatus for producing an easy-to-tear plastic film according to the first embodiment of the present invention.
Figure 5:
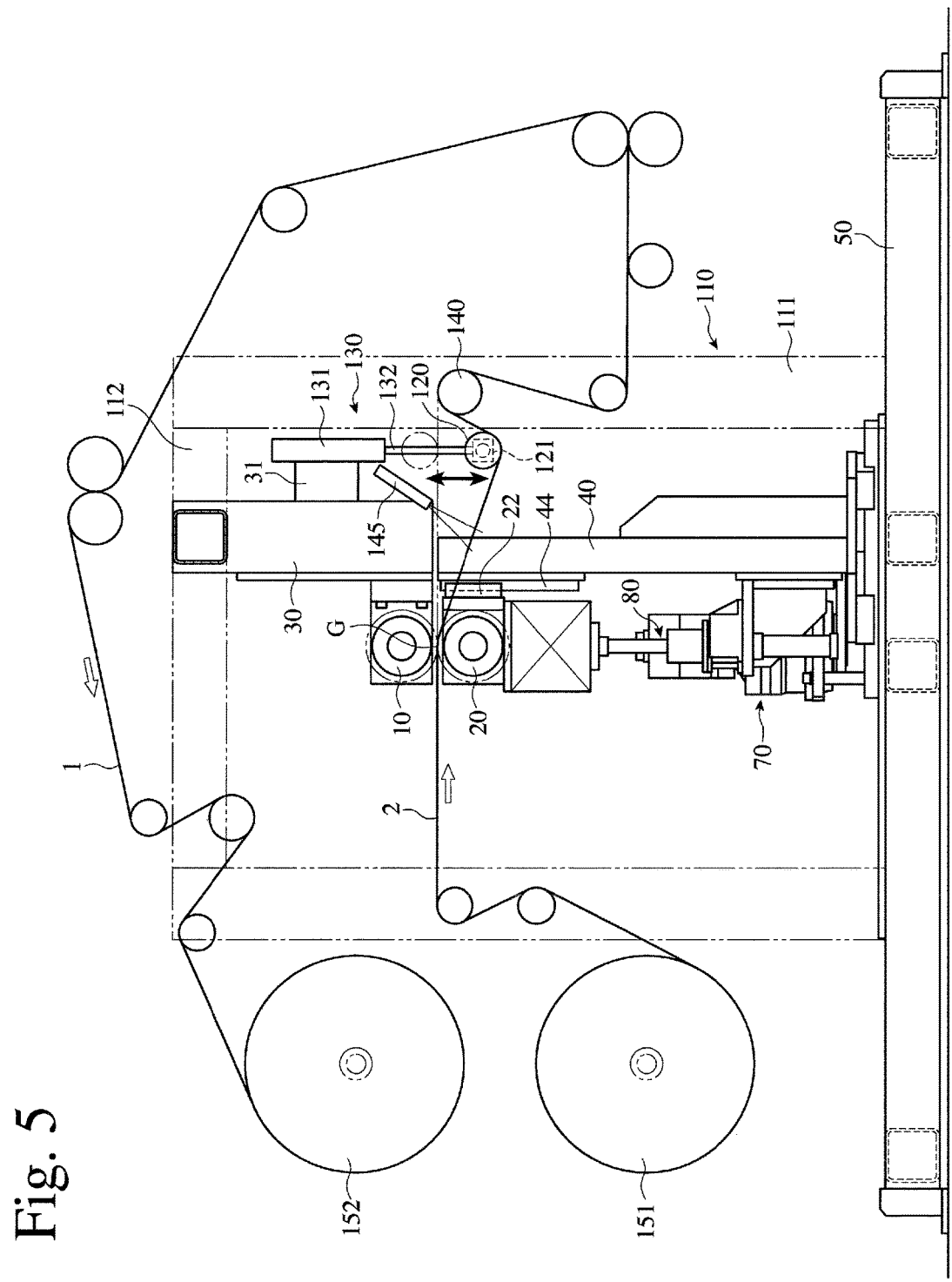
FIG. 5 is a right side view showing an apparatus for producing an easy-to-tear plastic film according to the first embodiment of the present invention.

As shown in FIGS. 4 and 5, the apparatus for producing an easy-to-tear plastic film according to the first embodiment of the present invention comprises a first roll 10 and a second roll 20 opposing each other to form unpenetrating fine pores 2a in a plastic film 2; a pair of laterally arranged stationary frames 30, 30 supporting a pair of bearings 11, 11 of the first roll 10; a pair of laterally arranged movable frames 40, 40 supporting a pair of bearings 21, 21 of the second roll 20; movable plates 61, 61, to each of which each movable frame 40, 40 is fixed; a horizontal plate 60 fixed to the movable plates 61, 61; a first driving unit 70 fixed to an upper surface of a base 50 for rotating the horizontal plate 60; second driving units 80, 80 each moving each bearing 21, 21 of the second roll 20 up and down along each movable frame 40, 40; a third driving unit 90 for rotating the first roll 10; a fourth driving unit 100 for rotating the second roll 20; a first reel 151 around which a plastic film 2 is wound; a second reel 152 for winding a resultant easy-to-tear plastic film 1; and pluralities of guide rolls and nip rolls for guiding the plastic film 2 and the easy-to-tear plastic film 1. A strain-removing roll 120 coming into contact with a plastic film provided with large numbers (pluralities) of fine pores (unpenetrating-fine-pores-formed plastic film) 1, and a pair of fifth driving units 130, 130 for changing the heights of bearings 121, 121 rotatably supporting both ends of the strain-removing roll 120 are preferably disposed downstream of a gap G between the first roll 10 and the second roll 20.

One of the first and second rolls 10, 20 is a pattern roll randomly having large numbers of high-hardness, fine particles on its rolling surface, and the other is an anvil roll having a flat rolling surface. The anvil roll is preferably a metal roll from the aspects of surface hardness and cost, but it may be a ceramic roll. Embodiments below will be explained with a pattern roll as the first roll 10 and an anvil roll as the second roll 20, though not restrictive. Of course, the first roll 10 may be an anvil roll, and the second roll 20 may be a pattern roll.

(1) Stationary Members

Figure 6:
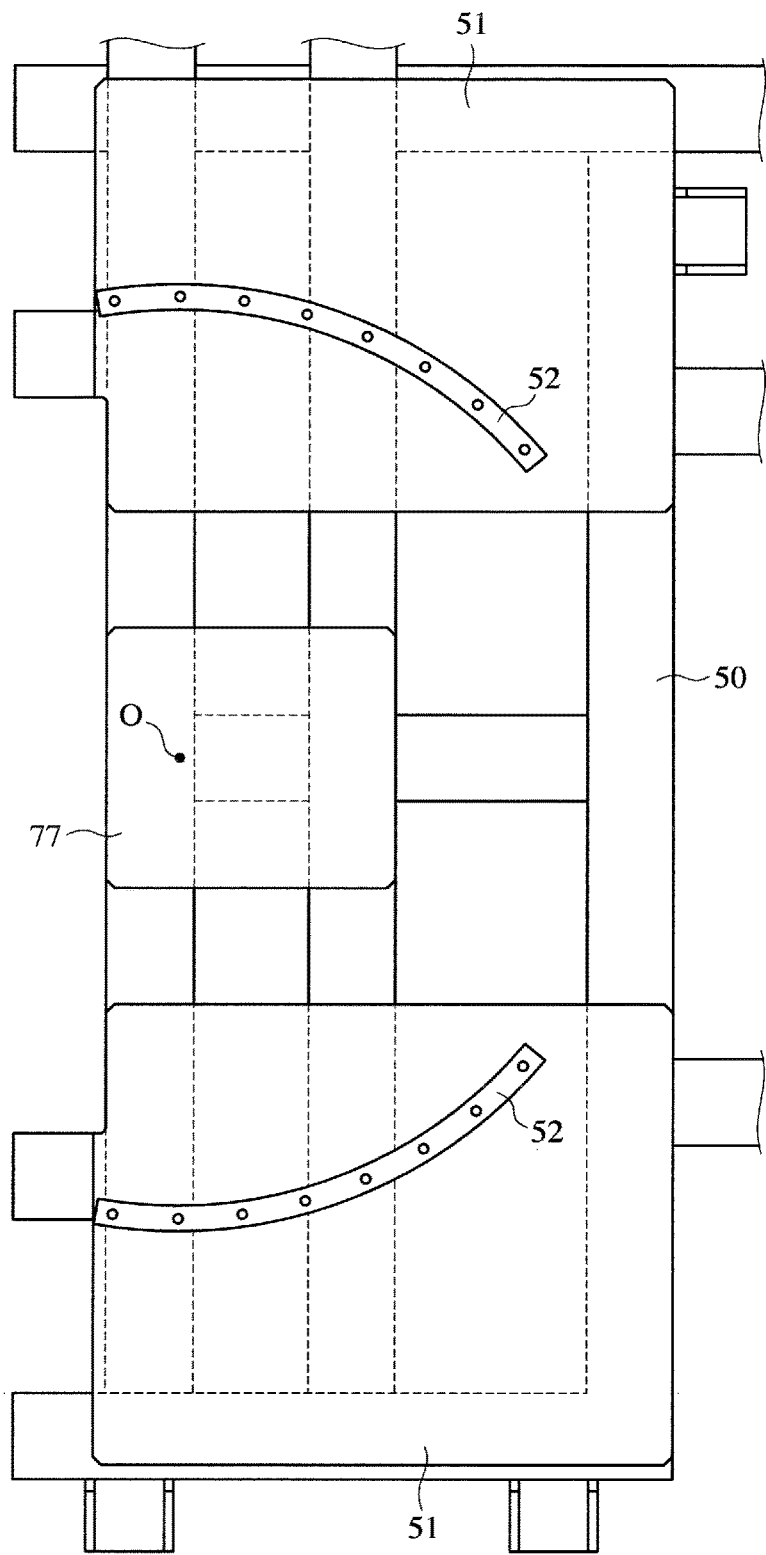
FIG. 6 is a plan view showing circularly curved guide rails fixed to a base.

As shown in FIGS. 4 and 5, a frame structure 110 comprising vertical frames 111, 111, and a pair of laterally arranged horizontal frames 112, 112 fixed to upper ends of the vertical frames 111, 111 is fixed to a base 50, and each of the stationary frames 30, 30 depends from each of the horizontal frames 112, 112. As shown in FIG. 4, each bearing 11 of the pattern roll 10 is rotatably supported by each stationary frame 30, so that the pattern roll 10 is rotated at a predetermined position without moving up and down. As shown in FIG. 6, a pair of laterally arranged flat plates 51, 51 are fixed to an upper surface of the base 50, and each circularly curved guide rail 52 is fixed by bolts to an upper surface of each flat plate 51. A frame 74 supporting the first driving unit 70 is fixed to a flat plate 77 in a center portion of the base 50.

(2) Movable Members

Figure 7:
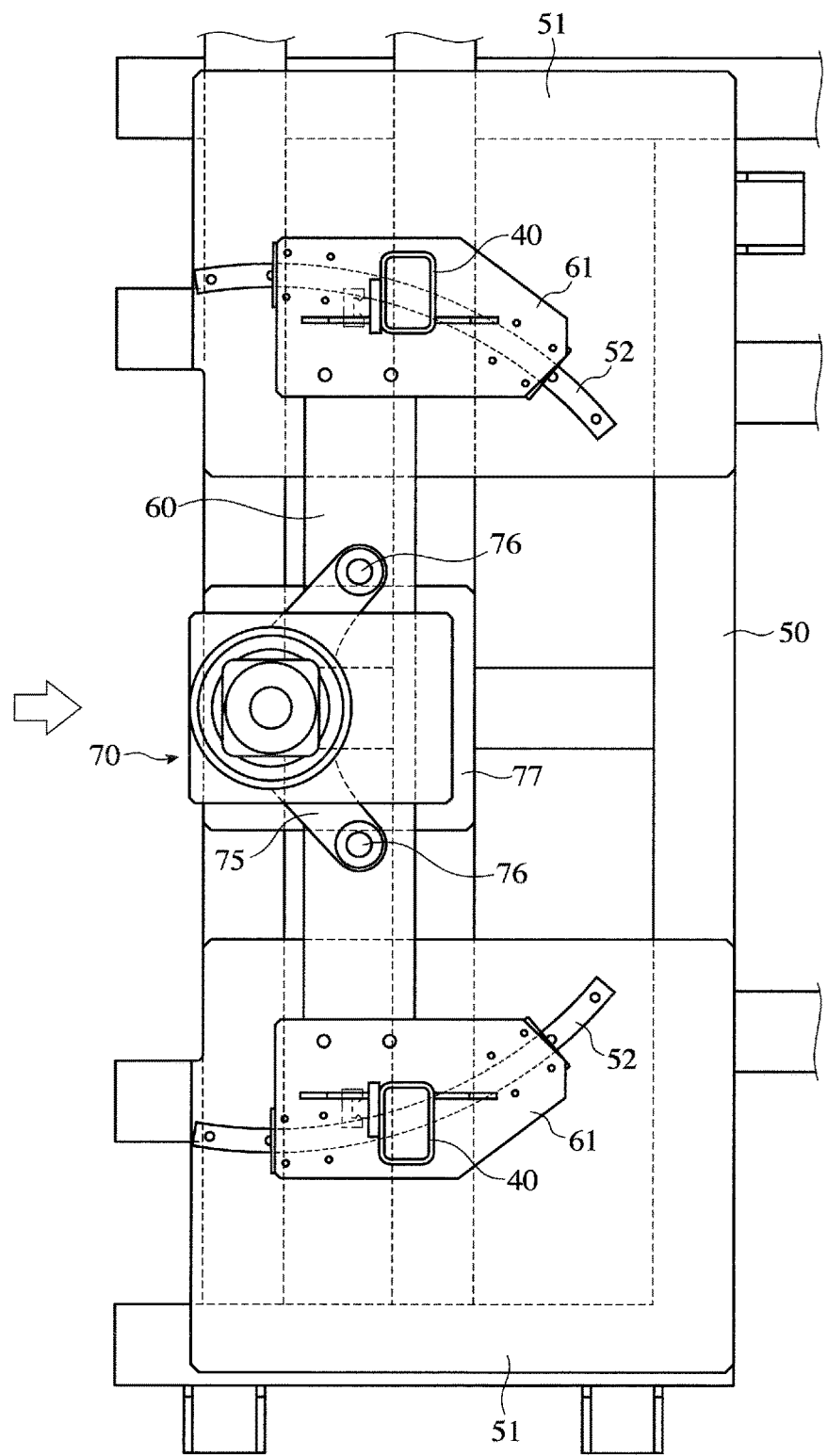
FIG. 7 is a partially omitted plan view showing the relation between circularly curved guide rails and a pair of laterally arranged movable frames.
Figure 8:
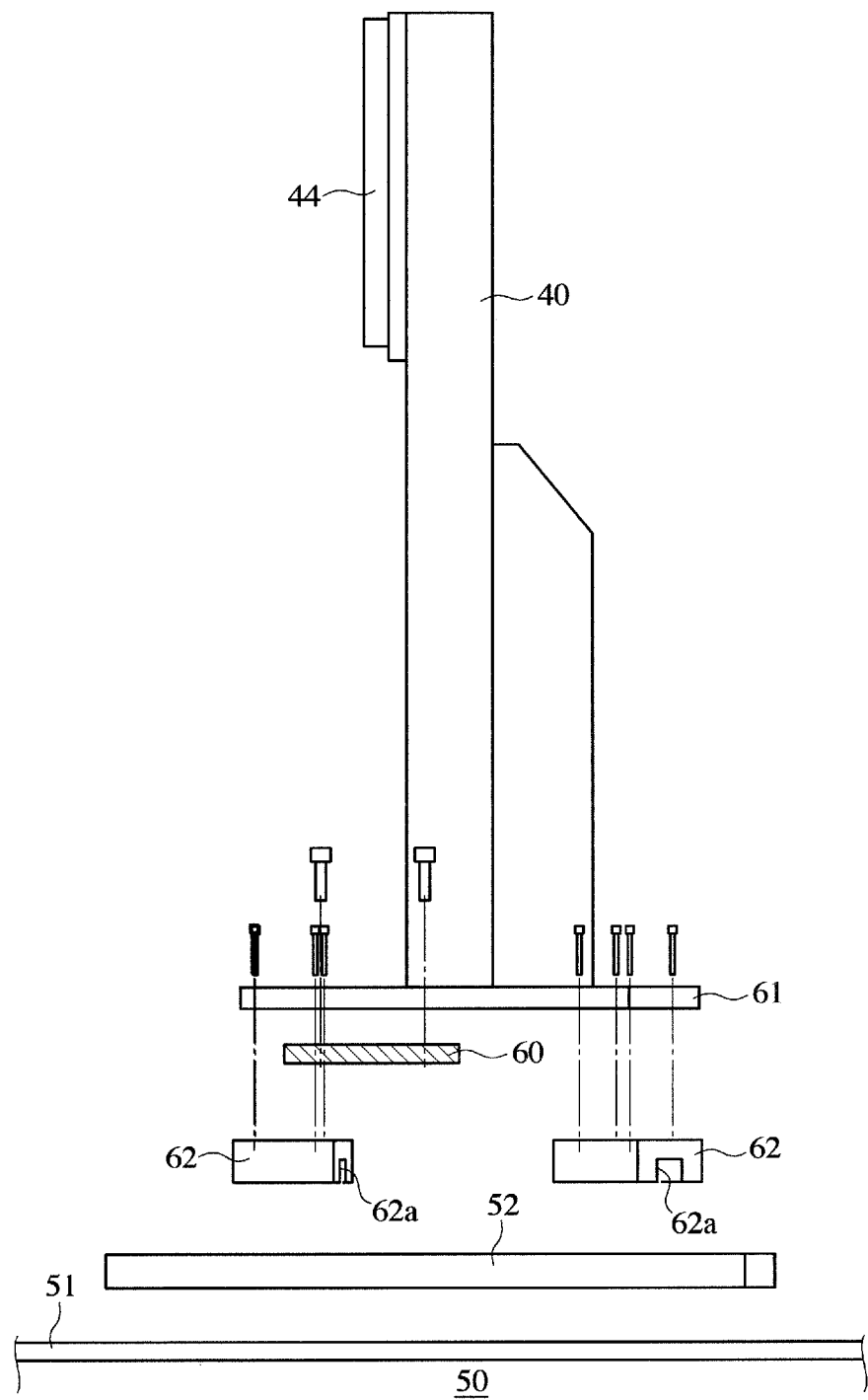
FIG. 8 is an exploded side view showing the structure of a movable frame movable along a circularly curved guide rail.

As is clear from FIGS. 4 and 7, each movable frame 40 fixed to an upper surface of each movable plate 61 is positioned under each stationary frame 30. As shown in FIG. 8, guide blocks 62 each having a guide groove 62a slidably engageable with the circularly curved guide rail 52 are fixed by bolts to a bottom surface of each movable plate 61. Both movable plates 61, 61 are fixed to both ends of the horizontal plate 60 by bolts.

The first driving unit 70 connected to the horizontal plate 60 comprises a motor 71, a reduction gear 73 connected to a shaft 72 of the motor 71, a frame 74 supporting the reduction gear 73, and a connector plate 75 fixed to the shaft 72. The frame 74 is fixed to the flat plate 77 on the base 50. The connector plate 75 is fixed to the horizontal plate 60 by bolts 76.

Figure 9:
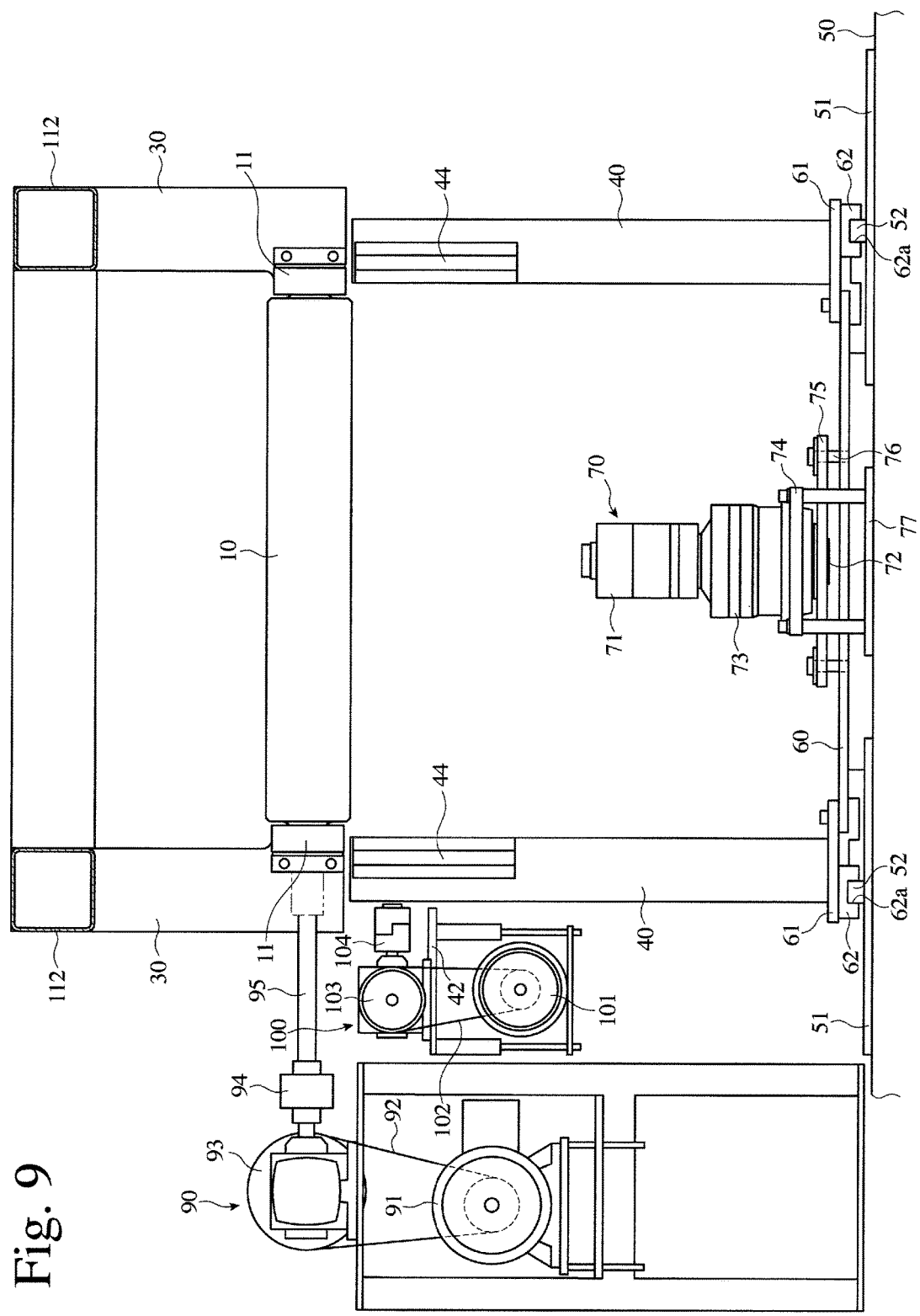
FIG. 9 is a front view showing the apparatus of FIG. 4 with a second roll and second driving units omitted.

Each second driving unit 80 is fixed to a bracket 41 of each movable frame 40. Each second driving unit 80 comprises a gear box 81 supported by the bracket 41 fixed to the movable frame 40, a motor 83 connected to the gear box 81 via a reduction gear 82, a screw jack 84 attached to the gear box 81, and a mail screw member 85 projecting from the screw jack 84. Each bearing 21 of the anvil roll 20 is supported by the mail screw member 85 of the screw jack 84 via a buffer 86. The buffer 86 comprises an elastic member such as a coil spring, and a load sensor, to prevent the bearing 21 of the anvil roll 20 from receiving excessive shock. As shown in FIGS. 5 and 9, a front surface of each movable frame 40 is provided with a vertical guide rail 44 engageable with a guide member 22 fixed to a rear surface of each bearing 21 of the anvil roll 20, so that the bearings 21 of the anvil roll 20 are movable up and down along the vertical guide rails 44, 44 of the movable frames 40, 40.

(3) Driving Unit of Pattern Roll

As shown in FIG. 4, the third driving unit 90 for rotating the pattern roll 10 comprises a motor 91, a reduction gear 93 connected to a rotation shaft of the motor 91 via a chain 92, and a coupling device 94 connected to a rotation shaft of the reduction gear 93, a shaft 95 extending from the coupling device 94 being connected to the bearing 11 of the pattern roll 10.

(4) Driving Unit of Anvil Roll

As shown in FIG. 4, the fourth driving unit 100 for rotating the anvil roll 20 is fixed to a bracket 42 fixed to one movable frame 40. The fourth driving unit 100 comprises a motor 101, a reduction gear 103 connected to a rotation shaft of the motor 101 via a chain 102, and a coupling device 104 connected to a rotation shaft of the reduction gear 103, a shaft 105 extending from the coupling device 104 being connected to the bearing 21 of the anvil roll 20.

(5) Strain-Removing Roll

Figure 10A:
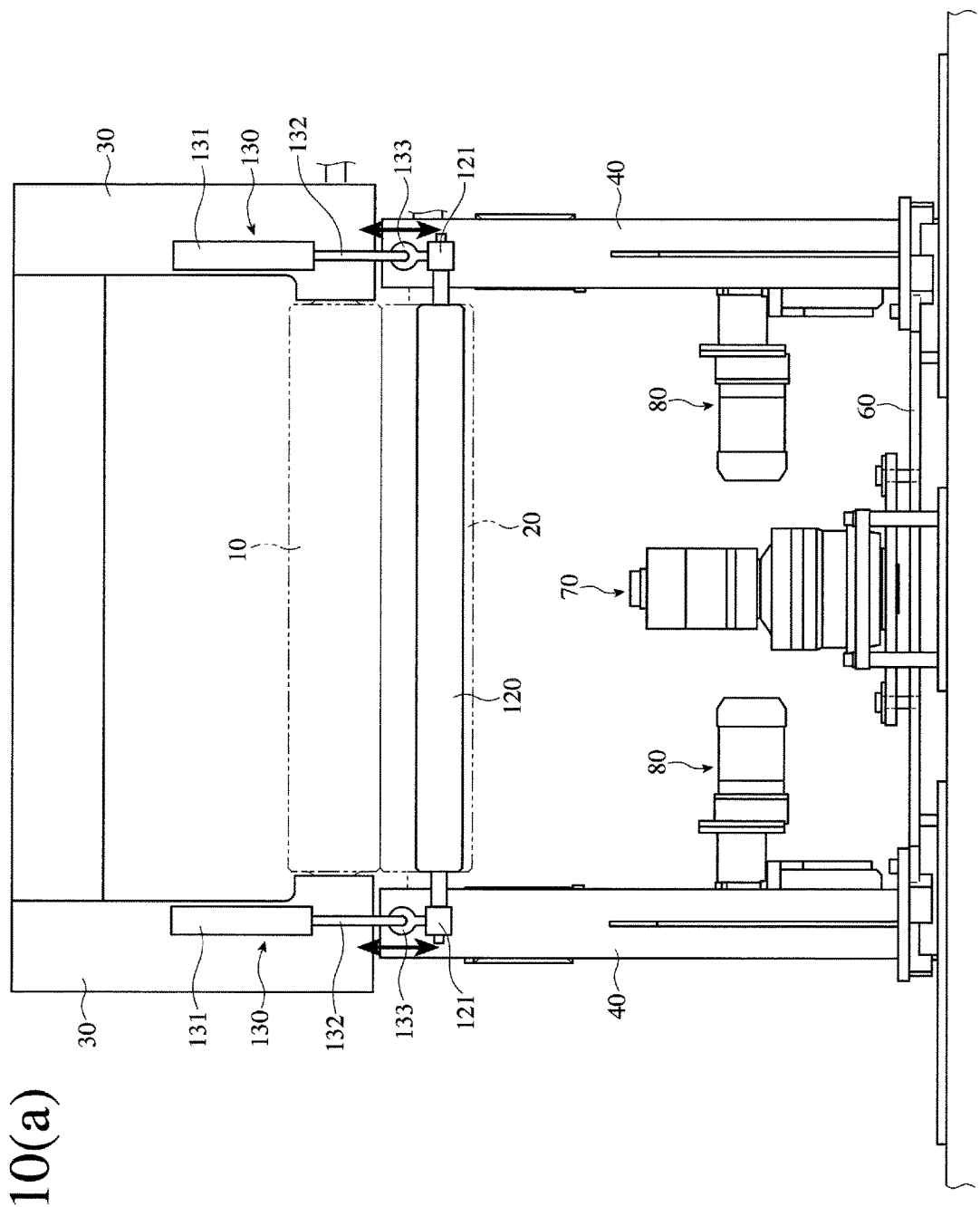
FIG. 10(a) is a rear view showing a strain-removing roll and fifth driving units mounted to the apparatus of the present invention.
Figure 10B:
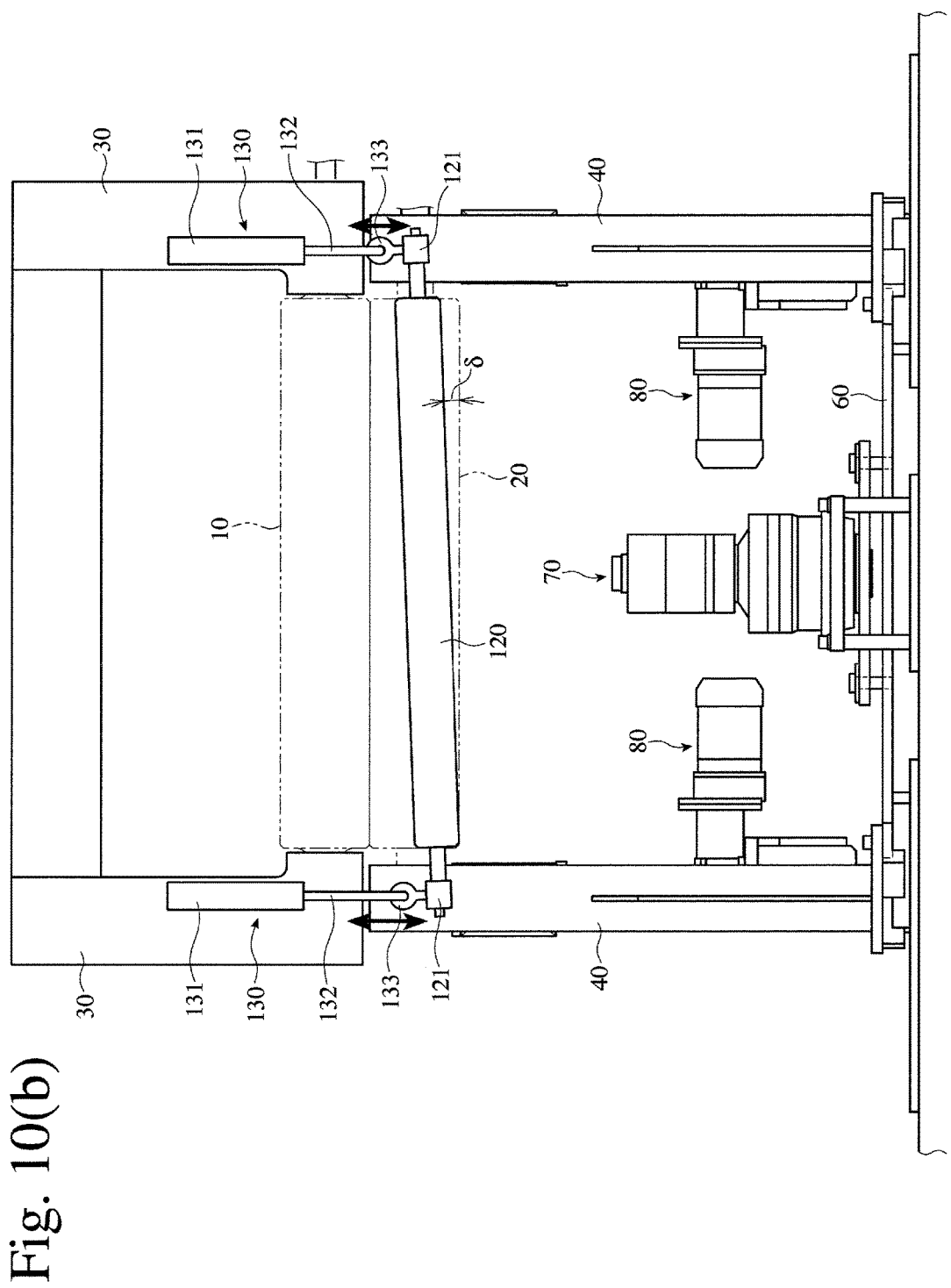
FIG. 10(b) is a rear view showing a strain-removing roll mounted to the apparatus of the present invention, which is in a vertically inclined state.

Because strain is generated in a plastic film provided with large numbers of unpenetrating fine pores (easy-to-tear plastic film) 1 passing through a gap G between the pattern roll 10 and the anvil roll 20 relatively inclined to each other, troubles such as rupture, etc. may occur in the easy-to-tear plastic film 1 when wound up as it is. Accordingly, a strain-removing roll 120 is preferably disposed immediately downstream of the gap G between the pattern roll 10 and the anvil roll 20 as shown in FIG. 5. As shown in FIG. 10(*a*), bearings 121, 121 rotatably supporting both ends of the strain-removing roll 120 are moved up and down by the fifth driving units 130, 130 fixed to a pair of the stationary frames 30, 30 via brackets 31, 31. In the depicted example, each fifth driving unit 130 comprises a cylinder (preferably an air or hydraulic cylinder) 131 supported by each bracket 31 fixed to each stationary frame 30, and a piston rod 132 slidably projecting from the cylinder 131, a tip end of the piston rod 132 being attached to the bearing 121 of the strain-removing roll 120 via a universal joint 133. Accordingly, as shown in FIG. 10(*b*), the heights of both ends of the strain-removing roll 120 can be changed by independently operating the fifth driving units 130, 130. Namely, the strain-removing roll 120 can be inclined at a desired angle δ relative to the horizon (parallel to the center axis of the pattern roll 10).

Because a guide roll 140 is positioned downstream of the strain-removing roll 120, the easy-to-tear plastic film 1 is subjected to laterally different tension by the inclined strain-removing roll 120 between the gap G and the guide roll 140, resulting in reduced strain. For example, when the anvil roll 20 is inclined such that a left side of the easy-to-tear plastic film 1 moves more forward than a right side, a left end of the strain-removing roll 120 is made higher than a right end by adjusting the strokes of the piston rods 132, 132 of a pair of the fifth driving units 130, 130, to sufficiently remove strain from the easy-to-tear plastic film 1 having unpenetrating fine pores 2*a* formed by the pattern roll 10 and the anvil roll 20 relatively inclined to each other, resulting in less likelihood of troubles such as rupture, wrinkling, etc. during a winding step.

(6) Pattern Roll

Figure 11:
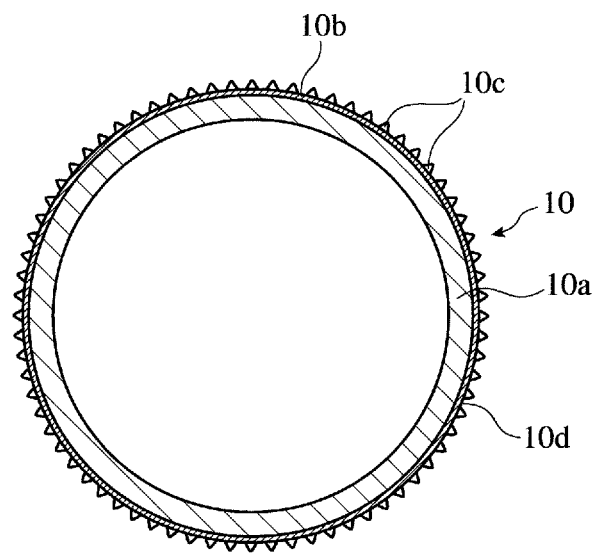
FIG. 11 is a cross-sectional view showing an example of pattern rolls.

As shown in FIG. 11, the pattern roll 10 preferably comprises large numbers of high-hardness, fine particles 10*c* randomly fixed to a rolling surface 10*b* of a metal roll body 10*a* by a plating layer 10*d* such as nickel plating, etc. Specific examples of such pattern roll 10 are described in, for example, JP 5-131557 A, JP 9-57860 A, and JP 2002-59487 A.

The high-hardness, fine particles 10*c* preferably have sharp edges (corners), and Mohs hardness of 5 or more. The high-hardness, fine particles 10*c* are preferably fine diamond particles, particularly pulverized fine diamond particles. The high-hardness, fine particles 10*c* preferably have aspect ratios of 3 or less. With the aspect ratios of 3 or less, the high-hardness, fine particles 10*c* have polygonal shapes close to spheres. The aspect ratios of the high-hardness, fine particles 10*c* are more preferably 2 or less, most preferably 1.5 or less.

With about ⅓ to about ⅔ of the high-hardness, fine particles 10*c* embedded in the plating layer 10*d*, the high-hardness, fine particles 10*c* projecting from a surface (rolling surface) of the plating layer 10*d* should have such average height and maximum height that enable the formation of unpenetrating fine pores 2*a* having an average depth Dav corresponding to 30-80% of the thickness T of the plastic film 2, and the maximum depth Dmax corresponding to 90% or less of the thickness T, in the plastic film 2. The average height of the high-hardness, fine particles 10*c* projecting from the rolling surface is preferably 30-80%, more preferably 35-70%, most preferably 40-60%, of the thickness T of the plastic film 2. The maximum height of the high-hardness, fine particles 10*c* projecting from the rolling surface is preferably 90% or less, more preferably 85% or less, most preferably 80% or less, of the thickness T of the plastic film 2. The average diameter of the high-hardness, fine particles 10*c* on the rolling surface of the pattern roll 10 is preferably 20-100 μm, more preferably 25-80 μm, most preferably 30-60 μm.

The distribution density of the high-hardness, fine particles 10*c* on the rolling surface of the pattern roll 10 is preferably 500-40,000/cm$^2$, more preferably 1,000-20,000/cm$^2$, most preferably 2,000-10,000/cm$^2$.

The area ratio of the high-hardness, fine particles 10*c* on a rolling surface 10*b* of the pattern roll 10 (a surface percentage of the pattern roll 10 occupied by the high-hardness, fine particles 10*c*) is preferably 10-70%. When the area ratio of the high-hardness, fine particles 10*c* is less than 10%, unpenetrating fine pores 2*a* cannot be formed at a sufficient density in the plastic film 2. On the other hand, the fixing of the high-hardness, fine particles 10*c* to the rolling surface 10*b* of the pattern roll 10 at an area ratio of more than 70% is practically difficult. The area ratio of the high-hardness, fine particles 10*c* is more preferably 20% in lower limit, and 60% in upper limit.

Using the pattern roll 10 having high-hardness, fine particles 10*c* having the above distribution, the shapes of the high-hardness, fine particles 10*c* are transferred to the unpenetrating fine pores 2*a* formed in the plastic film 2. To obtain a pattern roll 10 having high-hardness, fine particles 10*c* meeting the above conditions, a surface of the pattern roll 10 having high-hardness, fine particles 10*c* embedded in the plating layer 10*d* is preferably ground by a grinder, etc., in order that all high-hardness, fine particles 10*c* are not higher than a predetermined level.

To prevent the pattern roll 10 from being bent while forming unpenetrating fine pores 2a in the plastic film 2, a roll body 10a of the pattern roll 10 is preferably made of a hard metal. The hard metal may be die steel such as SKD11.

(7) Anvil Roll

The anvil roll 20 to be combined with the pattern roll 10 is preferably a metal roll from the aspects of surface hardness and cost, but it may be a ceramic roll. In order that the high-hardness, fine particles 10c of the pattern roll 10 do not penetrate the plastic film 2, the anvil roll 20 should have a flat rolling surface. The rolling surface is preferably a mirror surface. Also, to exhibit sufficient deformation resistance under a load during the formation of unpenetrating fine pores 2a, the anvil roll 20 is preferably made of a high-strength, hard metal [for example, high-strength, corrosion-resistant stainless steel (SUS440C, SUS304, etc.)]. The anvil roll 20 may have a two-layer structure comprising an inner layer of hard metal such as die steel, and an outer layer of high-strength, corrosion-resistant stainless steel such as SUS304. The outer layer may be practically as thick as about 20-60 mm.

The high-hardness, fine particles 10c bite the plastic film 2 passing through a gap between the pattern roll 10 having large numbers of high-hardness, fine particles 10c on the rolling surface 10a and the anvil roll 20 having a flat rolling surface 20a. Because the average height and maximum height of high-hardness, fine particles 10c projecting from a rolling surface of the pattern roll 10 are sufficiently smaller than the thickness T of the plastic film 2, the high-hardness, fine particles 10c do not penetrate the plastic film 2. Accordingly, only unpenetrating fine pores 2a are formed in the plastic film 2.

(8) Sensor

A sensor 145 is preferably disposed downstream of the gap G between the pattern roll 10 and the anvil roll 20, to observe the characteristics (diameter distribution and opening ratio of unpenetrating fine pores 2a, wrinkles of the film, etc.) of an unpenetrating-fine-pores-formed plastic film 1 exiting from the gap G. The apparatus of the present invention also comprises a controller (not shown), to which output signals of the sensor 145 are input. According to the output signals of the sensor 145, the controller forms a signal for adjusting the gap between the pattern roll 10 and the anvil roll 20, a signal for adjusting the horizontal inclination angle θ of the center axis of the anvil roll 20 to the center axis of the pattern roll 10, and a signal for adjusting the vertical inclination angle δ of the strain-removing roll 120, to obtain a desired unpenetrating-fine-pores-formed plastic film 1.

(B) Second Embodiment

Because the apparatus in the second embodiment has basically the same structure as that of the apparatus in the first embodiment except for a backup roll, the same reference numerals are assigned to common members, and explanations will be omitted except for the backup roll.

Figure 12:
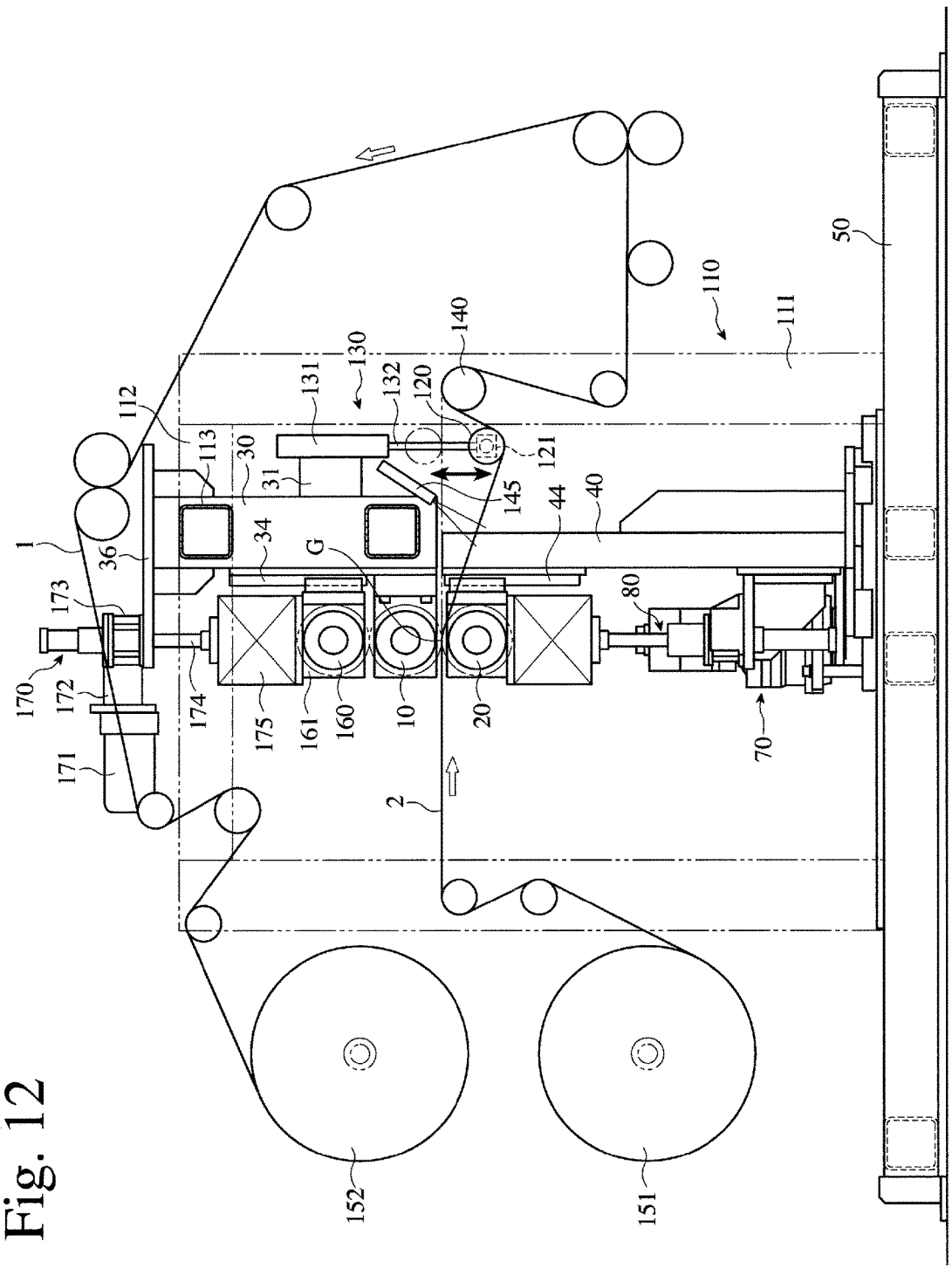
FIG. 12 is a side view showing an apparatus for producing an easy-to-tear plastic film according to the second embodiment of the present invention.

As shown in FIG. 12, the apparatus in the second embodiment comprises a backup roll 160 above the pattern roll 10, to reduce the bending of the pattern roll 10 when forming unpenetrating fine pores 2a. The backup roll 160 coming into contact with the pattern roll 10 is preferably a roll having a relatively elastic rolling surface, such as a rubber roll, etc. The backup roll 160 is movable up and down along vertical guide rails 34, 34 of a pair of the stationary frames 30, 30 fixed to the second horizontal frame 113 extending between a pair of horizontal frames 112, 112.

Both bearings 161, 161 of the backup roll 160 are driven by a pair of sixth driving units 170, 170 fixed to the brackets 36, 36 of a pair of stationary frames 30, 30. Each sixth driving unit 170 comprises a motor 171, a reduction gear 172 connected to the motor 171, a screw jack 173 mounted to a bracket 36 fixed to the stationary frame 30 and connected to the reduction gear 172, a mail screw member 174 projecting from the screw jack 173, and a buffer 175 mounted to a lower end of the mail screw member 174. The buffer 175 comprises an elastic member such as a coil spring, and a load sensor, to prevent excessive shock from being applied to the bearing 161 of the backup roll 160.

When the mail screw member 174 of the screw jack 173 is lowered by the operation of the motor 171 as shown in FIG. 12, the bearing 161 of the backup roll 160 is pushed downward via the buffer 175. As a result, the backup roll 160 pushes the pattern roll 10 downward to reduce the bending of the pattern roll 10 during forming unpenetrating fine pores 2a. With the bending of the pattern roll 10 reduced, a relative inclination angle between the pattern roll 10 and the anvil roll 20 can be made smaller, thereby reducing strain generated in the easy-to-tear plastic film 1.

[2] Production of Easy-to-Tear Plastic Film

When the anvil roll 20 at a downward position is in parallel with the pattern roll 10 (the horizontal inclination angle θ of the center axis of the anvil roll 20 to the center axis of the pattern roll 10 is 0°), a plastic film 2 unwound from the first reel 151 passes through a large gap G between the pattern roll 10 and the anvil roll 20, the strain-removing roll 120, the guide roll 140, and pluralities of guide rolls and nip rolls, and is wound up by the second reel 152, while operating the third and fourth driving units 90, 100 to rotate the pattern roll 10 and the anvil roll 20.

When the second driving units 80, 80 are operated, the anvil roll 20 is moved upward, so that the plastic film 2 gradually comes into contact with the pattern roll 10 and the anvil roll 20 in the gap G, thereby being pressed by them.

Figure 13A:
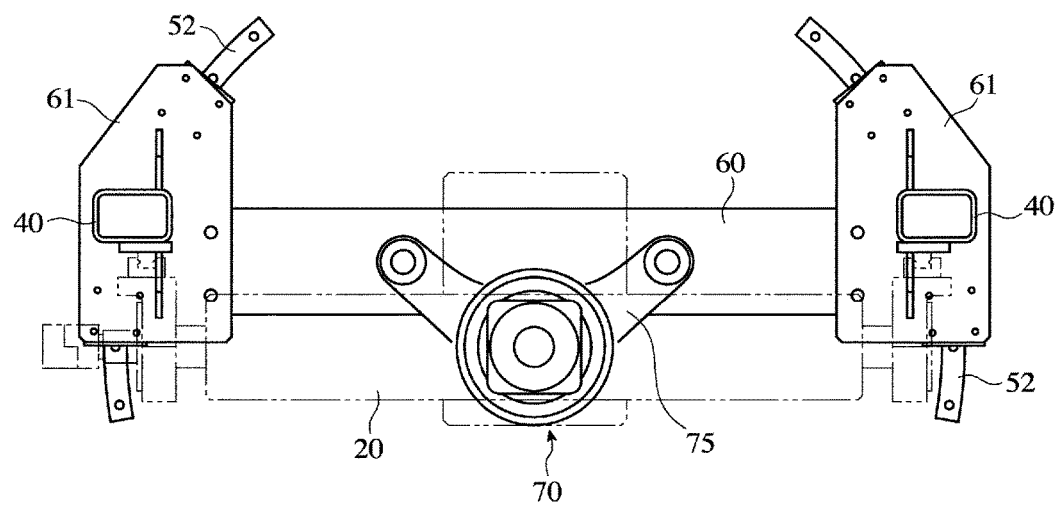
FIG. 13(a) is a plan view showing the relation between a pair of laterally arranged movable frames and a pair of circularly curved guide rails when a second roll is parallel with a first roll.
Figure 13B:
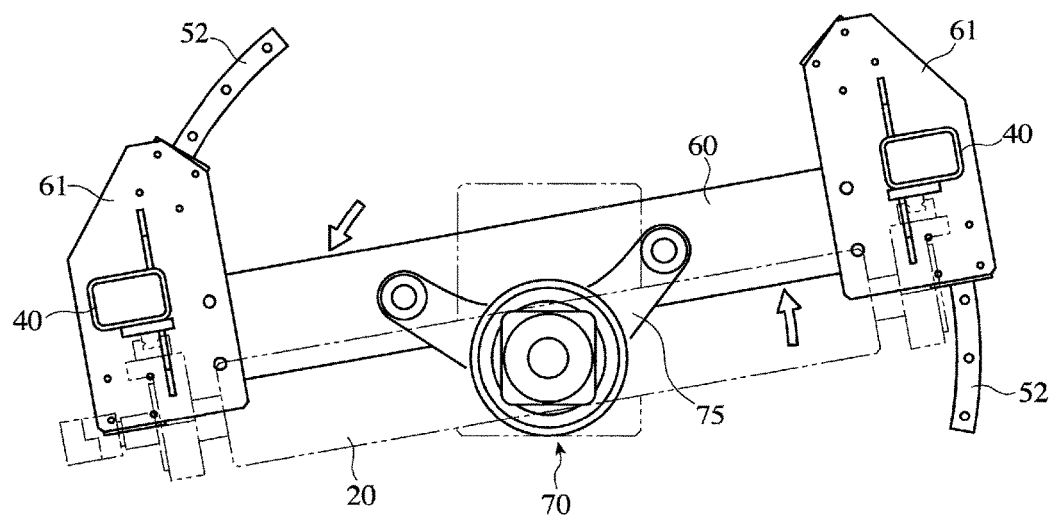
FIG. 13(b) is a plan view showing the relation between a pair of laterally arranged movable frames and a pair of circularly curved guide rails when a second roll is inclined counterclockwise to a first roll in a horizontal plane.
Figure 13C:
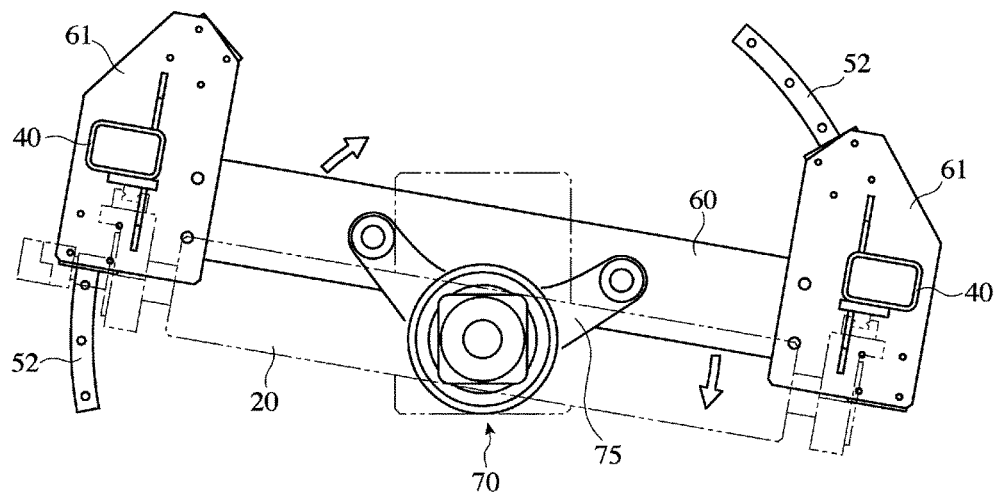
FIG. 13(c) is a plan view showing the relation between a pair of laterally arranged movable frames and a pair of circularly curved guide rails when a second roll is inclined clockwise to a first roll in a horizontal plane.
Figure 14:
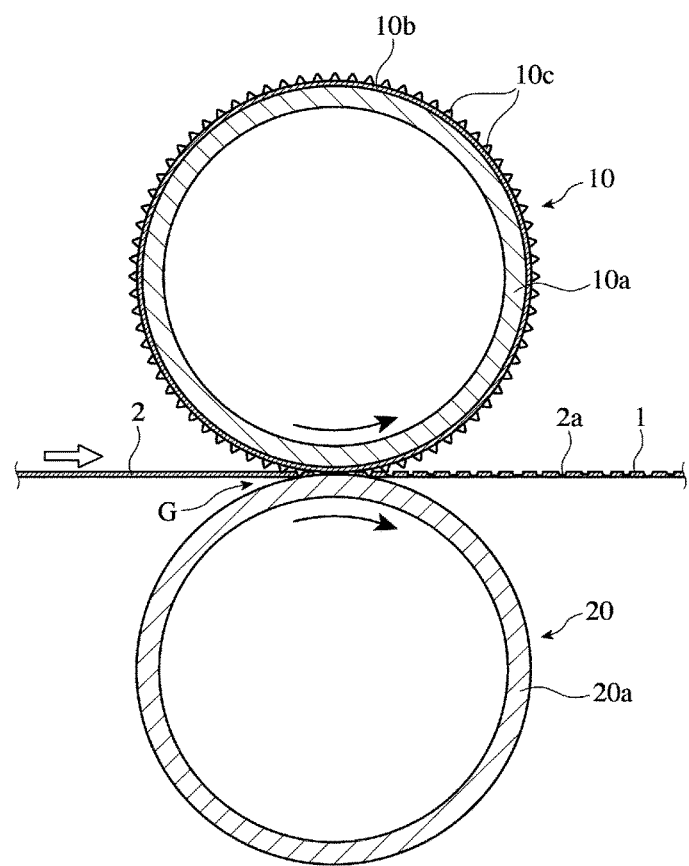
FIG. 14 is a cross-sectional view showing the formation of unpenetrating fine pores in a plastic film by a combination of a pattern roll and an anvil roll having a flat rolling surface.

When the first driving unit 70 is operated (rotated) around the center point O, a pair of movable plates 61, 61 connected to the horizontal plate 60 are laterally rotated along the circularly curved guide rails 52, 52, so that the anvil roll 20, whose bearings 21, 21 are fixed to the movable frames 40, 40, is inclined in a horizontal plane from a state parallel to the pattern roll 10 [FIG. 13(a)], counterclockwise [FIG. 13(b)], or clockwise [FIG. 13(c)]. When the anvil roll 20 is inclined by a desired angle θ clockwise or counterclockwise relative to the pattern roll 10 in a horizontal plane, stress applied to the plastic film 2 passing through the gap G between the pattern roll 10 and the anvil roll 20 is made laterally uniform. FIG. 14 shows the formation of unpenetrating fine pores 2a in the plastic film 2 by the high-hardness, fine particles 10c of the pattern roll 10.

The characteristics of the plastic film 2 (unpenetrating-fine-pores-formed plastic film 1 after the formation of unpenetrating fine pores 2a is started) exiting from the gap G are observed by the sensor 145, whose signal is output to a controller (not shown), which forms a first signal for adjusting (optimizing) the gap G between the pattern roll 10 and the anvil roll 20, a second signal for adjusting (optimizing) the horizontal inclination angle θ of the center axis of the anvil roll 20 to the center axis of the pattern roll 10, and a third signal for adjusting (optimizing) the vertical inclination angle δ of the strain-removing roll 120. In this state, unpenetrating fine pores 2a are formed in the plastic film 2 to form a desired unpenetrating-fine-pores-formed plastic film 1, which is finally wound around the second reel 152.

[3] Easy-to-Tear Plastic Film

Figure 1:
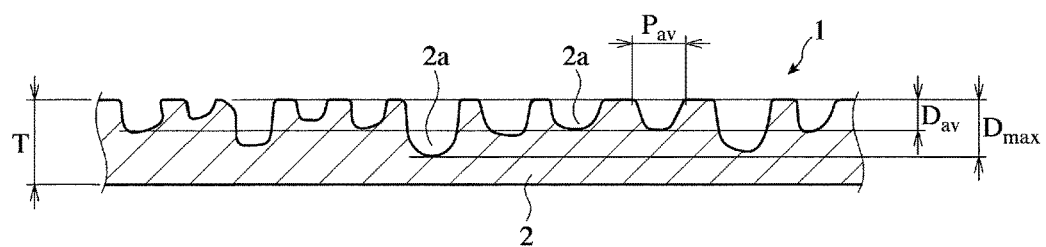
FIG. 1 is a partial cross-sectional view showing an easy-to-tear plastic film produced by the apparatus of the present invention.

As shown in FIG. 1, the easy-to-tear plastic film 1 produced by the apparatus of the present invention has large numbers of unpenetrating fine pores 2a on an entire surface of the plastic film 2, the unpenetrating fine pores 2a having an average depth Dav corresponding to 30-80% of the thickness T of the plastic film 2 and the maximum depth Dmax corresponding to 90% or less of the thickness T of the plastic film 2. The unpenetrating fine pores 2a have an average pore diameter Pav of 20-100 and a distribution density Ds of 500-40,000/cm$^2$.

As described below, because the unpenetrating fine pores 2a are formed by large numbers of high-hardness, fine particles having various sizes and heights, which are randomly attached to the pattern roll surface, the unpenetrating fine pores 2a have various sizes and depths. However, in order to achieve easy tearing from any position while completely preventing the penetration of oxygen, moisture, etc., the unpenetrating fine pores 2a should have an average depth Dav corresponding to 30-80% of the thickness T of the plastic film 2, and the maximum depth Dmax corresponding to 90% or less of the thickness T of the plastic film 2.

The unpenetrating fine pores 2a having an average depth Dav of less than 30% cannot provide the plastic film 2 with sufficient easiness of tearing. On the other hand, when the average depth Dav is more than 80%, all fine pores formed cannot be unpenetrating fine pores. The average depth Dav of the unpenetrating fine pores 2a is preferably 35-70%, more preferably 40-60%, of the thickness T of the plastic film.

When the maximum depth Dmax of the unpenetrating fine pores 2a is more than 90%, all fine pores formed cannot be unpenetrating fine pores. The maximum depth Dmax of the unpenetrating fine pores 2a is preferably 85% or less, more preferably 80% or less, of the thickness T of the plastic film.

When the average pore diameter Pav of the unpenetrating fine pores 2a is less than 20 μm, sufficient easiness of tearing cannot be given to the plastic film 2. On the other hand, the unpenetrating fine pores 2a having an average pore diameter Pav of more than 100 μm provide the plastic film 2 with insufficient strength and poor surface appearance. The average pore diameter Pav of the unpenetrating fine pores 2a is preferably 25-80 μm, more preferably 30-60 μm.

The unpenetrating fine pores 2a having the above average depth Dav, maximum depth Dmax and average pore diameter Pav preferably have as narrow depth distribution and pore diameter distribution as possible. To this end, the high-hardness, fine particles 10c of the pattern roll 10 preferably have as narrow a particle diameter distribution as possible.

When the distribution density Ds of the unpenetrating fine pores 2a is less than 500/cm$^2$, it is impossible to provide the plastic film 2 with sufficient easiness of tearing. On the other hand, when the distribution density Ds is more than 40,000/cm$^2$, the easy-to-tear plastic film 1 has insufficient strength. The distribution density Ds of the unpenetrating fine pores 2a is preferably 1,000-20,000/cm$^2$, more preferably 2,000-10,000/cm$^2$.

Plastics for forming the film 2 are not restricted, as long as they have sufficient tensile strength, surface hardness, flexibility, gas barrier, water resistance and heat resistance. They are preferably flexible thermoplastic polymers such as polyesters [polyethylene terephthalate (PET), polybutylene terephthalate (PBT), etc.], polyolefins [oriented polypropylene (OPP), etc.], polyamides [nylon (Ny), etc.], polyvinyl chloride, polyvinylidene chloride, polystyrenes. Among them, PET and OPP are preferable, and PET is particularly preferable.

The thickness T of the plastic film 2 is preferably 8-30 μm. With the thickness T of less than 8 μm, the plastic film 2 does not have sufficient tensile strength. On the other hand, when the thickness T is more than 30 μm, the plastic film 2 has low flexibility, not suitable for a wrapping film of dry foods, etc. The thickness T of the plastic film 2 is preferably 10-25 μm, more preferably 10-20 μm.

Figure 2:
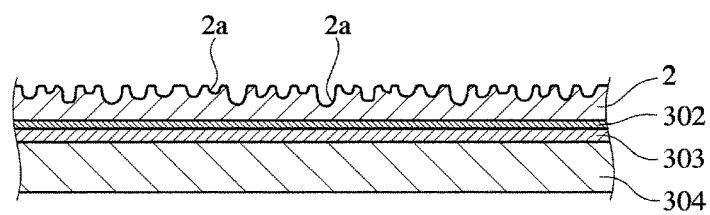
FIG. 2 is a partial cross-sectional view showing an aluminum-deposited laminate film comprising a layer of an easy-to-tear plastic film produced by the apparatus of the present invention.
Figure 3A:
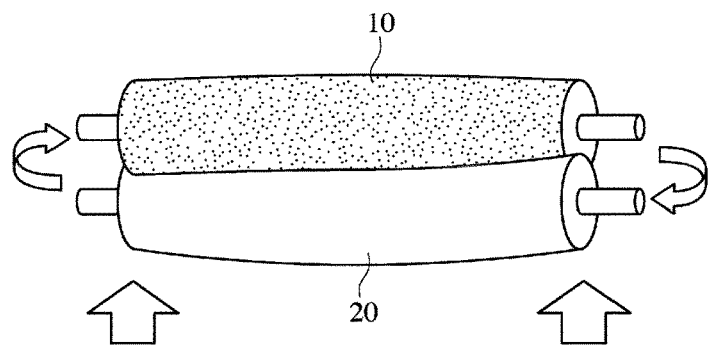
FIG. 3(a) is a perspective view exaggeratingly showing a pattern roll and an anvil roll relatively inclined to each other.
Figure 3B:
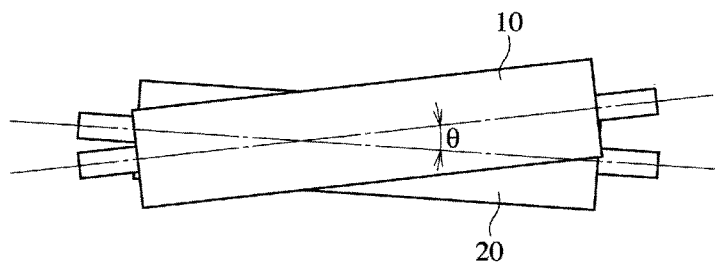
FIG. 3(b) is a plan view exaggeratingly showing a pattern roll and an anvil roll relatively inclined to each other.

When the easy-to-tear plastic film 1 produced by the apparatus of the present invention is used as a wrapping film of dry foods, etc., as shown in FIG. 2, a print layer 302, a gas barrier layer 303 and a heat-sealing layer 304 are preferably formed on a rear surface of the easy-to-tear plastic film 1 (on the side having no unpenetrating fine pores 2a). The gas barrier layer 303 may be an aluminum foil, a vapor-deposited aluminum layer, or a vapor-deposited, transparent inorganic oxide layer. The vapor-deposited, transparent inorganic oxide layer may be a vapor-deposited layer of silicon oxide or alumina. When high-degree gas barrier is not required, the gas barrier layer 303 may be omitted. The heat-sealing layer 304 necessary for sealing a bag of the easy-to-tear plastic film 1 may be formed by low-density polyethylene (LDPE), unoriented polypropylene (CPP), ethylene-vinyl acetate copolymers (EVA), etc. The thickness of the heat-sealing layer 304 may be about 20-60 μm.

The present invention will be explained in detail by Examples below without intention of restriction.

Example 1

Using the apparatus of the present invention shown in FIGS. 4-13, unpenetrating fine pores 2a were formed in a 1,000-mm-wide, aluminum-deposited PET film (thickness: 12 μm) 2 on the side of having no vapor deposition layer. The inclination angle of the center axis of the anvil roll 20 to the center axis of the pattern roll 10 in a horizontal plane was adjusted in a range from 0.415° to 0.83°. A 50-cm-long sample cut out of the unpenetrating-fine-pores-formed PET film 1 was transversely cut to 100-mm-long test pieces PT1, which were put on a white paper and each painted with a black permanent marker (Magic Ink®) in a region of 5 cm×1 cm. It was found that any white paper under each test piece PT1 was not stained with the black ink. It was thus confirmed that all pores formed were unpenetrating fine pores.

With respect to test pieces PT2 obtained in the same manner as above, the average depth Dav, maximum depth Dmax and average pore diameter Pav of unpenetrating fine pores 2a were measured by photomicrographs of their cross sections. Also, the distribution density Ds of unpenetrating fine pores 2a was measured by photomicrographs of their flat surfaces. The measurement results are shown in Table 1.

Example 2

Using the apparatus of the present invention shown in FIGS. 4-13, unpenetrating fine pores 2a were formed in a 1,000-mm-wide, transparent silica-alumina-deposited PET film (thickness of the PET film: 12 μm, and a barrier coating on the transparent vapor deposition layer) on the side of having no vapor deposition layer. The inclination angle of the center axis of the anvil roll 20 to the center axis of the pattern roll 10 in a horizontal plane was adjusted in a range from 0.415° to 0.83°. The same painting test with a black permanent marker as in Example 1 confirmed that all pores formed were unpenetrating fine pores. The average depth Dav, maximum depth Dmax, average pore diameter Pav and distribution density Ds of the unpenetrating fine pores $2a$ were measured in the same manner as in Example 1. The measurement results are shown in Table 1.

TABLE 1

| No. | Dav[1] (μm/%) | Dmax[2] (μm/%) | Pav (μm) | Ds (/cm$^2$) |
|---|---|---|---|---|
| Example 1 | 9.0/75 | 10.5/88 | 25 | 25,000 |
| Example 2 | 8.5/71 | 10.0/83 | 20 | 20,000 |

Note:
[1] The average depth Dav of unpenetrating fine pores 2a, and its ratio to the thickness T of the plastic film 2.
[2] The maximum depth Dmax of unpenetrating fine pores 2a, and its ratio to the thickness T of the plastic film 2.

Figure 15:
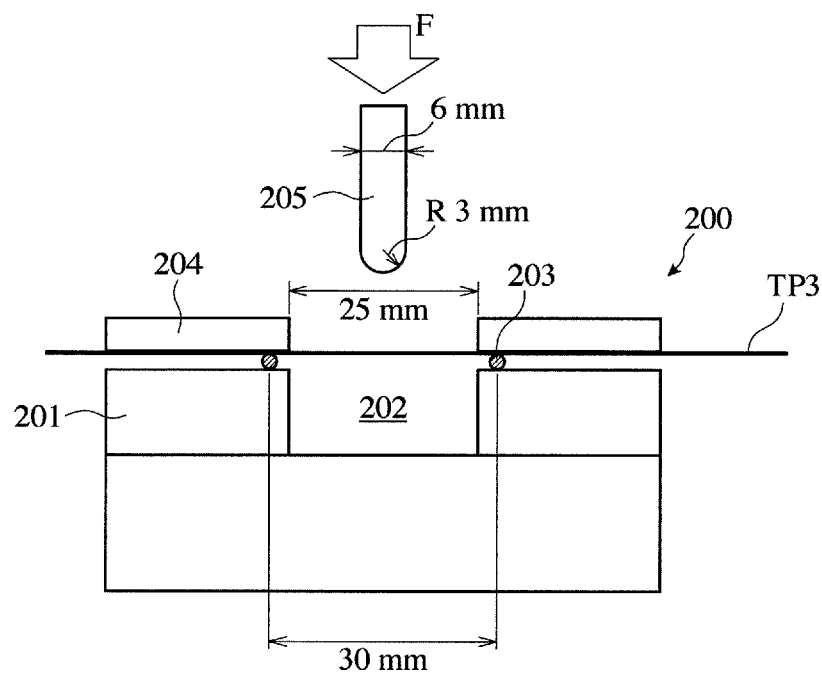
FIG. 15 is a schematic view showing a pricking test of a film.
Figure 16:
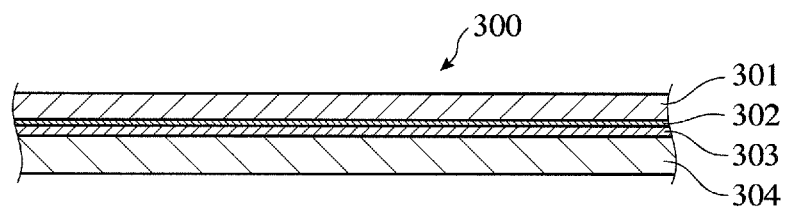
FIG. 16 is a partial cross-sectional view showing an example of the layer structures of an aluminum-deposited film.
Figure 17:
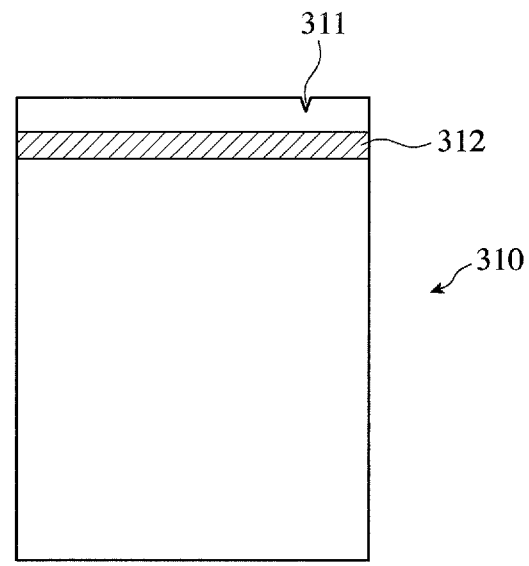
FIG. 17 is a front view showing an example of bags of an aluminum-deposited film.
Figure 18:
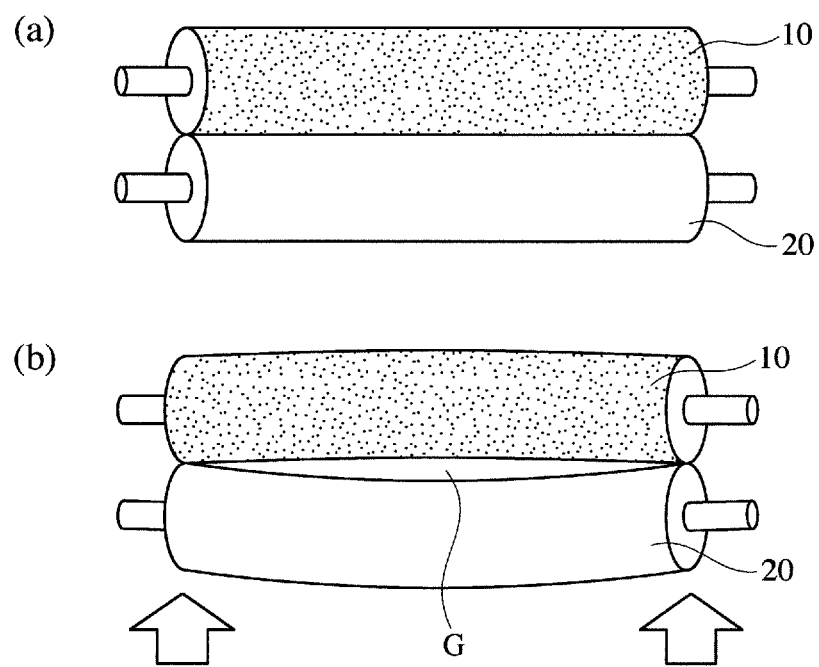
FIG. 18 is a schematic view exaggeratingly showing a pattern roll and an anvil roll arranged in parallel, which are bent during the formation of unpenetrating fine pores in a plastic film.

A 30-μm-thick heat-sealing layer (low-density polyethylene) was adhered to each 1,000-mm-wide unpenetrating-fine-pores-formed plastic film 1 of Examples 1 and 2 via a 10-μm-thick adhesive layer, to prepare Samples 1 and 2. each sample was transversely cut to 10 test pieces PT3 each as long as 100 mm, to which a pricking test shown in FIG. 15 was conducted. A pricking test apparatus 200 comprises a base 201 having a center cylindrical space 202 (diameter: 25 mm), a rubber O-ring 203 having a diameter of 30 mm, a pushing plate 204 having a circular opening having a diameter of 25 mm, and a pricking rod 205 having a diameter of 6 mm, whose tip end portion is in a semicircular shape (radius of curvature R: 3 mm). Each test piece PT3 was put on the O-ring 203 on the base 201, and firmly gripped by the pushing plate 204. In this state, each test piece PT3 was pushed by the rod 205 slowly moving downward, to measure a load F of the rod 205 until each test piece PT3 was ruptured. The maximum load until rupture occurred is defined as the rupture strength of each test piece PT3. The results are shown in Table 2.

TABLE 2

| | Maximum Load (N) Until Rupture Occurred | | | | | | | | | |
|---|---|---|---|---|---|---|---|---|---|---|
| Test Piece[1] | 1 | 2 | 3 | 4 | 5 | 6 | 7 | 8 | 9 | 10 |
| Sample 1 | 18.3 | 18.9 | 18.5 | 18.9 | 18.7 | 18.3 | 17 | 17.7 | 17.3 | 18.3 |
| Sample 2 | 16.3 | 17.5 | 17.1 | 17.5 | 18.3 | 17.2 | 16.5 | 16.6 | 17.5 | 17.7 |

Note:
[1] Numbers were given to 10 test pieces PT3 from one side.

It was confirmed from Table 2 that both Samples 1 and 2 had sufficiently high rupture strength with sufficiently small rupture strength difference in a transverse direction.

Each Sample 1 and 2 was transversely cut to 10 test pieces PT4 each as long as 100 mm, to conduct a tearing test from arbitrary positions. As a result, any test piece PT4 could be torn easily.

EFFECTS OF THE INVENTION

Because the second roll (for example, an anvil roll having a flat rolling surface) moves up and down along the movable frame relative to the first roll (for example, a pattern roll) rotatably supported by the stationary frames, and the movable frames are swung along a pair of laterally-arranged, horizontal, circularly-curved guide rails in the apparatus of the present invention, the horizontal inclination angle of a center axis of the second roll to a center axis of the first roll can be properly set depending on the opening diameters, depth, surface density, etc. of unpenetrating fine pores formed in the plastic film, thereby forming the unpenetrating fine pores transversely uniformly in the plastic film. Also, by setting the average height and maximum height of high-hardness, fine particles randomly attached to a rolling surface of the pattern roll to such levels as enabling the formation of unpenetrating fine pores having average depth corresponding to 30-80% of the thickness of the plastic film and the maximum depth corresponding to 90% or less of the thickness of the plastic film, the high-hardness, fine particles can be surely prevented from penetrating the plastic film.

Further, strain generated in the unpenetrating-fine-pores-formed plastic film by the inclination of the center axis of the second roll to the center axis of the first roll is absorbed by a strain-removing roll vertically inclined to the unpenetrating-fine-pores-formed plastic film at a position downstream of a gap between the first and second rolls, thereby preventing the rupture and wrinkling of the plastic film during forming unpenetrating fine pores.

Because the easy-to-tear plastic film produced by the apparatus of the present invention has large numbers of unpenetrating fine pores having an average depth corresponding to 30-80% of the thickness of the plastic film, the maximum depth corresponding to 90% or less of the thickness of the plastic film, an average pore diameter of 20-100 μm, and a distribution density of 500-40,000/cm$^2$, the easy-to-tear plastic film can be easily torn from any position while completely preventing the penetration of oxygen, moisture, etc. The easy-to-tear plastic films having such features can be used widely for wrapping films of dry foods, etc., which should avoid oxygen, moisture, etc.

DESCRIPTION OF REFERENCE NUMERALS

1: Easy-to-tear plastic film (unpenetrating-fine-pores-formed plastic film)
2: Plastic film
2a: Unpenetrating fine pore
10: First roll (pattern roll)
10a: Roll body
10b: Rolling surface
10c: High-hardness, fine particle
10d: Plating layer
11: Bearing
20: Second roll (anvil roll)
20a: Roll body
21: Bearing
30: Stationary frame
31, 36: Bracket
34: Vertical guide rail
40: Movable frame
41, 42: Bracket
44: Vertical guide rail 50: Base
51: Flat plate
52: Circularly curved guide rail
60: Horizontal plate
61: Movable plate
62: Guide block
62a: Guide groove
70: First driving unit
71: Motor
72: Shaft of motor
73: Reduction gear
74: Frame
75: Connector plate
76: Bolt
77: Flat plate
80: Second driving unit
81: Gear box
82: Reduction gear
83: Motor
84: Screw jack
85: Mail screw member
86: Buffer
90: Third driving unit
91: Motor
92: Chain
93: Reduction gear
94: Coupling device
95: Shaft
100: Fourth driving unit
101: Motor
102: Chain
103: Reduction gear
104: Coupling device
105: Shaft
110: Frame structure
111: Vertical frame
112: Horizontal frame
113: Second horizontal frame
120: Strain-removing roll
121: Bearing of strain-removing roll
130: Fifth driving unit
131: Cylinder
132: Piston rod
133: Universal joint
140: Guide roll
145: Sensor
151: Reel around which plastic film is wound
152: Reel around which unpenetrating-fine-pores-formed plastic film is to be wound
160: Backup roll
161: Bearing
170: Sixth driving unit
171: Motor
172: Reduction gear
173: Screw jack
174: Mail screw member
175: Buffer
200: Pricking test apparatus
201: Base
202: Cylindrical space of base
203: O-ring
204: Pushing plate
205: Pricking rod
300: Aluminum-deposited film
301: PET film
302: Print layer
303: Vapor-deposited aluminum layer
304: Heat-sealing layer
310: Bag
311: Notch
312: Heat-sealed portion
T: Thickness of plastic film
TP1, TP2, TP3, TP4: Test piece
Dav: Average depth of unpenetrating fine pores
Dmax: Maximum depth of unpenetrating fine pores
Pav: Average pore diameter of unpenetrating fine pores
G: Gap between first and second rolls
O: Rotation center of first driving unit
θ: Horizontal inclination angle of center axis of second roll to center axis of first roll
δ: Vertical inclination angle of strain-removing roll

What is claimed is:

1. An apparatus for producing an easy-to-tear plastic film randomly having pluralities of unpenetrating fine pores on an entire surface of a plastic film, comprising
   a first roll rotatably supported by a pair of laterally arranged stationary frames;
   a second roll movable up and down along a pair of laterally arranged movable frames, such that said second roll comes into contact with said first roll via a plastic film;
   rolls for passing said plastic film through a gap between said first and second rolls;
   a first motor for rotating the pair of said movable frames;
   second motors each mounted to each of said movable frames to move said second roll up and down;
   a third motor for rotating said first roll; and
   a fourth motor for rotating said second roll;
   one of said first and second rolls being a pattern roll randomly having pluralities of high-hardness, fine particles on its rolling surface, and the other being an anvil roll having a flat rolling surface;
   the high-hardness, fine particles projecting from a rolling surface of said pattern roll having such average height and maximum height as to enable the formation of unpenetrating fine pores having an average depth corresponding to 30-80% of the thickness of said plastic film and the maximum depth corresponding to 90% or less of the thickness of said plastic film, in said plastic film; and
   with the center axis of said second roll inclined to the center axis of said first roll in a horizontal plane by the operation of said first motor, said plastic film passing through a gap between said first and second rolls, thereby forming pluralities of unpenetrating fine pores transversely uniformly in said plastic film by said high-hardness, fine particles.

2. The apparatus for producing an easy-to-tear plastic film according to claim 1, wherein the pair of said movable frames are rotated by said first motor along a pair of laterally-arranged, horizontal, circularly-curved guide rails.

3. The apparatus for producing an easy-to-tear plastic film according to claim 1, wherein
   movable plates, to which said movable frames are fixed, are fixed to both ends of a horizontal plate connected to said first motor; and
   each of said circularly curved guide rails engages a guide groove on a bottom surface of each of said movable plates.

4. The apparatus for producing an easy-to-tear plastic film according to claim 1, wherein
   a strain-removing roll coming into contact with a plastic film provided with pluralities of unpenetrating fine pores (unpenetrating-fine-pores-formed plastic film), and a pair of fifth motors for changing the heights of bearings rotatably supporting both ends of said strain-removing roll are arranged downstream of a gap between said first and second rolls; and at least one end of said strain-removing rolls is moved up or down by operating at least one of said fifth motors, thereby vertically inclining said strain-removing roll to the unpenetrating-fine-pores-formed plastic film, to absorb strain generated in said unpenetrating-fine-pores-formed plastic film due to the inclination of the center axis of said second roll to the center axis of said first roll.

5. The apparatus for producing an easy-to-tear plastic film according to claim 4, further comprising a sensor disposed downstream of a gap between said first and second rolls for observing the characteristics of the resultant unpenetrating-fine-pores-formed plastic film; and a controller receiving output signals of said sensor for forming a signal for adjusting a gap between said first and second rolls, a signal for adjusting the horizontal inclination angle of the center axis of said second roll to the center axis of said first roll, and a signal for adjusting the vertical inclination angle of said strain-removing roll, to obtain a desired unpenetrating-fine-pores-formed plastic film.

6. The apparatus for producing an easy-to-tear plastic film according to claim 5, wherein the formation of unpenetrating fine pores in said plastic film is started, in a state where the horizontal inclination angle of the center axis of said second roll to the center axis of said first roll is 0°, and where the vertical inclination angle of said strain-removing roll is 0°; and said first and second motors and said fifth motors are then operated according to the output signals of said sensor.

7. The apparatus for producing an easy-to-tear plastic film according to claim 1, wherein said first roll is a pattern roll, and said second roll is an anvil roll.

8. The apparatus for producing an easy-to-tear plastic film according to claim 1, wherein said high-hardness, fine particles of said pattern roll have sharp edges and Mohs hardness of 5 or more.

9. The apparatus for producing an easy-to-tear plastic film according to claim 1, wherein said high-hardness, fine particles have an average particle diameter of 20-100 μm on the rolling surface.

10. The apparatus for producing an easy-to-tear plastic film according to claim 1, wherein the distribution density of said high-hardness, fine particles on the rolling surface of said pattern roll is 500-40,000/cm$^2$.

11. The apparatus for producing an easy-to-tear plastic film according to claim 1, wherein the area ratio of said high-hardness, fine particles on the rolling surface of said pattern roll is 10-70%.

* * * * *